United States Patent
Maddox

(10) Patent No.: US 6,744,361 B1
(45) Date of Patent: Jun. 1, 2004

(54) VEHICULAR SAFETY BRAKE LIGHT SYSTEM

(76) Inventor: Harold Maddox, 3121 Navajo Cir., Gainesville, GA (US) 30501

( * ) Notice: Subject to any disclaimer, the term of this patent is extended or adjusted under 35 U.S.C. 154(b) by 56 days.

(21) Appl. No.: 10/010,609

(22) Filed: Dec. 10, 2001

(51) Int. Cl.[7] .................................................. B60Q 1/44
(52) U.S. Cl. ..................................... 340/479; 340/467
(58) Field of Search ................................ 340/463, 464, 340/467, 468, 471, 475, 479; 362/61

(56) References Cited

U.S. PATENT DOCUMENTS

| | | |
|---|---|---|
| 3,576,527 A | 4/1971 | Howard |
| 3,693,151 A | 9/1972 | Hasegawa et al. |
| 4,346,365 A | 8/1982 | Ingram |
| 4,403,210 A | 9/1983 | Sullivan |
| 4,851,813 A * | 7/1989 | Gottlieb ...................... 340/474 |
| 4,987,405 A | 1/1991 | Jakobowski |
| 5,172,095 A | 12/1992 | Scott |
| 5,345,218 A | 9/1994 | Woods et al. |
| 5,565,841 A | 10/1996 | Pandohie |
| 5,736,926 A * | 4/1998 | Winholtz ..................... 340/479 |
| 5,886,628 A | 3/1999 | Alhassoon |
| 5,909,173 A * | 6/1999 | Mason et al. ................ 340/467 |
| 6,100,799 A | 8/2000 | Fenk |
| 6,249,219 B1 * | 6/2001 | Perez et al. .................. 340/467 |

* cited by examiner

Primary Examiner—Benjamin C. Lee
(74) Attorney, Agent, or Firm—William B. Noll

(57) ABSTRACT

A vehicle safety light bulb operable in first and second modes. The bulb includes a self-contained electrical circuit having a timer mechanism, with a reset, to control the first operating mode for a preselected time, such as 2–3 seconds, where a preferred first mode is a flashing light.

8 Claims, 1 Drawing Sheet

Fig. 1
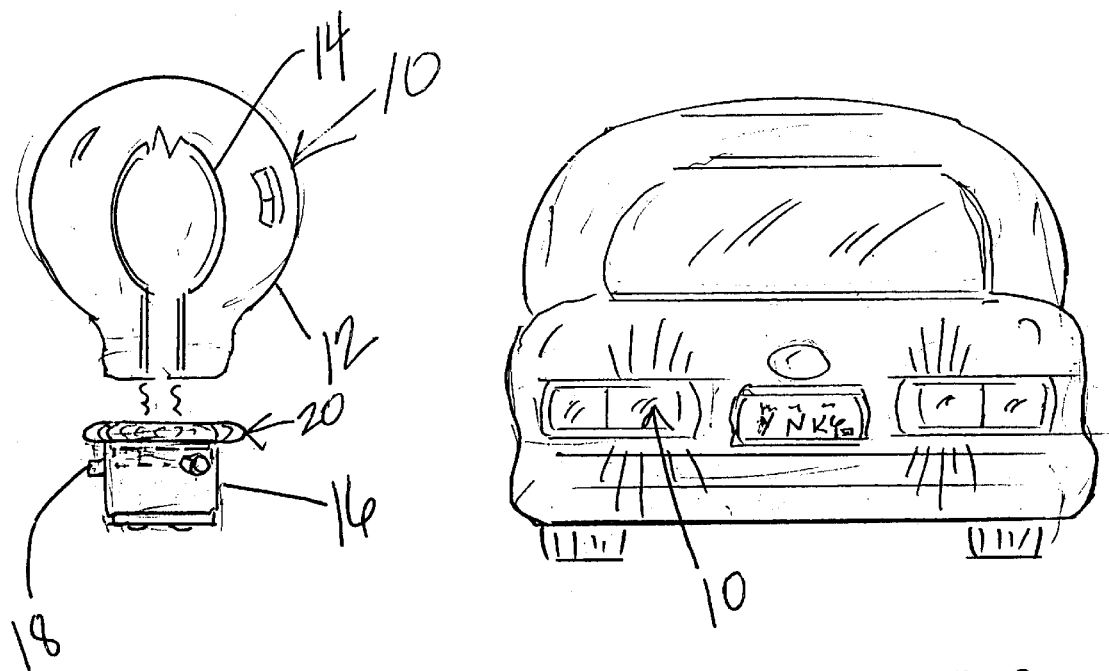
Fig. 3
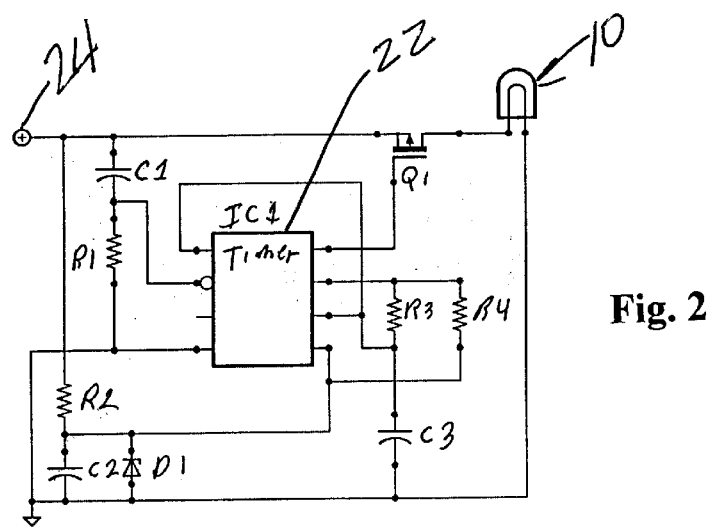
Fig. 2

VEHICULAR SAFETY BRAKE LIGHT SYSTEM

FIELD OF THE INVENTION

This invention is directed to the field of enhanced safety features for vehicles, particularly to a new safety brake system that Initially presents a modified brake light to alert following vehicles of the braking of the vehicle mounting the system hereof.

BACKGROUND OF THE INVENTION

The present invention relates to a vehicular safety brake system to alert trailing vehicles on the initiation of the braking system by a leading vehicle, where the traditional brake light, as modified, flashes, such as like a rapid strobe light, to signal to the trailing vehicles of the initiation of the braking system for the leading vehicle. After such initial change, such as about 2–3 seconds, the brake light returns to its normal operational mode.

Road vehicles, such as automobiles and trucks, typically include a light system to aid night driving, and blinking light turn signals, both of which are intended to alert other drivers of the intention and direction of a driven vehicle. Further, such vehicles include brake lights that indicate the equipped vehicle is either slowing down or has stopped. Unfortunately, especially at night, such limited information does not fully inform an approaching vehicle of the status of the vehicle. For instance, for waning traffic participants who are following a leading vehicle, the application of the brakes of the leading vehicle is conventionally indicated with two or three brake lights located on the rear exterior of the vehicle. In road traffic, a driver of a vehicle following the leading vehicle is momentarily informed only that the driver of the leading vehicle is operating the brake pedal. The light signal provides no direct information to the following driver concerning the actual intensity of the braking or the deceleration of the leading vehicle. On the contrary, the following driver must observe and assess additional visual information to determine the deceleration of the leading vehicle, for example, by recognizing how fast the relative gap between the two vehicles is changing. Depending on how well the following driver detects and assesses this secondary visual information, the following driver must attempt to adapt the speed and the gap more or less to the vehicle driving ahead.

The prior art, in recognizing the need for providing additional aids for drivers, especially for drivers in trailing and approaching vehicles, has developed a number of different systems for incorporating into the braking system of vehicles, where any such aid may help reduce vehicular accidents. The various systems of the prior art are reflected in the following U.S. Patents:

a.) U.S. Pat. No. 6,100,799, to Fenk, discloses an arrangement for indicating the braking intensity or the deceleration of a vehicle. A signal generating device generates a signal corresponding to a deceleration of the vehicle, or a brake pedal force of the driver. An indicating device, which has at least two brake lights, indicates braking information assigned to the respective signal and a controller controls the indicating device on the basis of the signal provided by the signal generating device. The indicating device outputs various signals which correspond to various respective levels of braking intensity.

b.) U.S. Pat. No. 5,886,628, to Alhassoon, relates to a brake light system for a vehicle that includes features of a conventional vehicle brake lighting system connected to a delay timing means. The brake light system includes rear brake lights connected in a conventional manner with a car battery and a brake pedal switch. The brake light system provides a delay feature whereupon the brake lights continue to be illuminated for a predetermined time period after ceasing depression, or release of the brake pedal, thus moving the brake pedal switch to an opened condition. The brake delay timer member is configured to conveniently adapt conventional vehicle brake light systems by insertion into the vehicle fuse box after removal of the brake light fuse.

c.) U.S. Pat. No. 5,565,841, to Pandohie, teaches a system for enhancing perception of the illumination of a plurality of brake lights. The system includes an input line which is coupled to a vehicle brake switch and may have an input coupled to a vehicle's turn signal switch assembly for determining when the flashing of the brake lights should occur. The voltage provided from a brake switch is coupled through a normally closed relay contact for coupling to the output of the system, such being coupled to the respective vehicle brake lights. When the brake switch is closed the brake lights are flashed at a predetermined flash rate, for a first predetermined time period, as established by a first timer circuit. Re-initiation of the flashing sequence is inhibited for a second time period established by second timer. Further, the flashing sequence may be terminated or inhibited responsive to the closure of a turn signal switch, such changing the logic state of an input of the first timer to thereby prevent interminttent energization of the relay and the corresponding intermittent opening of the associated relay contacts.

d.) U.S. Pat. No. 5,345,218, to Woods et al. covers a vehicle having left and right lower rear brake lights and a center high-mounted stop lamp (CHMSL) that flashes the CHMSL when the brakes are initially applied. The lower brake lights do not automatically flash. After a predetermined duration, the CHMSL remains continuously activated until brakes are removed. A semiconductor oscillator circuit is configured to be energized when brakes are applied. It produces an oscillating signal which is responsible for causing the CHMSL to flash. A semiconductor timer circuit is also configured to be energized when brakes are applied. It produces a time out signal which activates a predetermined duration after brakes are applied and which is responsible for causing the CHMSL to remain continuously activated. The outputs of the oscillator and timer circuits are combined at a semiconductor switch which drives the CHMSL.

e.) U.S. Pat. No. 5,172,095, to Scott, discloses a vehicle brake light system comprising an auxiliary brake light and a deceleration brake light both connected to a current source through a brake switch. A timer control module is operatively connected with the brake switch, auxiliary brake light and the deceleration light for causing the auxiliary brake light to flash "on" and "off" while the brake pedal switch is closed. In addition, the timer control module is operative to cause the deceleration light to flash "on" and "off" for a predetermined period after the brake pedal switch assumes an open state.

f.) U.S. Pat. No. 4,987,405, to Jakobowski, relates to an elevated third brake light flashing module for motor vehicles which is actuated by application of the brakes and employs a MOSFET transistor normally energized to pass current to the brake light. This is controlled in a simple manner by an oscillator and counter to cause the brake light to flash rapidly for a predetermined number of times followed by a prolonged "on" period in a sequential manner as long as pressure is applied to the brake pedal of the vehicle.

g.) U.S. Pat. No. 4,403,210, to Sullivan, teaches a brake light enhancer circuit which may be inserted into a conventional motor vehicle lighting system to provide a more eye catching braking or deceleration signal to following drivers. The circuit may be connected between the rear signal lamps, brake light switch and flasher in a conventional vehicle lighting system. It may include a timer or pulse generator, a counter and a disable latch. In motor vehicles having a pair of left and right turn signal lamps and a pair of left and right brake lamps, closure of the brake light switch when the turn signal switch is in its neutral position will cause the brake lamps to flash on and off a predetermined number of times and to thereafter remain continuously illuminated. When the turn signal switch is moved to either its left or right turn position the brake light enhancer circuit is disabled so that turn and brake light signals are conventional, thereby preventing confusion of following drivers.

h.) U.S. Pat. No. 4,346,365, to Ingram, covers a stopped vehicle warning device that comprises a time delay and a flasher to warn approaching vehicles of a stopped or slowing vehicle. The warning device is optionally integrated into the brake system of the vehicle, such that the brake lights on a vehicle are caused to flash when the brakes have been applied a predetermined length of time by a vehicle being slowed or stopped. The flasher stops and the timer is reset when the brakes have been released.

i.) U.S. Pat. No. 3,693,151, to Hasegawa et al., discloses a brake lamp circuit for vehicles and comprises brake lamps and brake lamp switch operated by depressing brake pedal. Both are connected in series to power sources Time relay is connected between brake lamp switch and brake lamps and flasher unit is connected between time relay and brake lamps. Time relay and flasher function to cause brake lamps to flash intermittently for a predetermined period of time after and while the brake pedal of vehicle is depressed.

j.) U.S. Pat. No. 3,576,527, to Howard, relates to a brake system wherein the brake lights of an automobile flash on and off for a predetermined period of time after the actuation of the automobile brakes. After the lapse of the flashing period the brake lights remain in a steady on condition for the remainder of the braking period. The flashing of the brake lights is accomplished ban incorporation of a solid-state circuit into the turn signal circuit presently available in most automobiles. The solid-state circuit includes a flasher unit which actuates the brake lights at the beginning of the automobile braking period. A current sensitive switch shorts out the flasher after a predetermined period of time, after which the brake lights remain steadily on.

None of the prior art noted above provide a unique system for giving a vehicle driver the security of a brake light mechanism to alert other drivers that does not require a modification or retrofitting of the brake light circuitry of a vehicle. The manner by which the present invention achieves the goals hereof will become more apparent in the description which follows, particularly when read in conjunction with the accompanying drawings.

SUMMARY OF THE INVENTION

This invention relates to a safety brake system for use in a variety of existing road vehicles without the need to modify or retrofit the electrical system of said vehicles. The system hereof preferably comprises a modified tail light bulb that, when the brake pedal is depressed, will flash at a rapid rate for a period of about 2 to 3 seconds before returning to the conventional or normal mode of a constant light. In a preferred embodiment, the modified light bulb comprises a vacuum bulb containing a filament, a base for engaging a complementary receptacle, where the receptacle places the bulb in electrical communication with the 12-volt battery of the vehicle, and an interrupter or intermediate chip to control the flashing rate of the bulb. A feature of the chip is a timer mechanism to initially activate and control the tail light bulb.

Accordingly, an object of this invention is to provide a means to immediately change the operating mode of a vehicle tail light to help alert approaching drivers of the initiation of the vehicle's braking system.

Another object hereof is the provision of a modified, self contained light bulb that may be incorporated into the brake light system of a vehicle without the need to alter or change the electrical system of a vehicle.

A further object of the invention is the provision of a modified light bulb that incorporates a chip containing circuit that effectively alters the operation of the light bulb.

These and other objects of the invention will become apparent in the specification which follows.

BRIEF DESCRIPTION OF DRAWINGS

FIG. 1 is an exploded side view of a modified vehicle tail light bulb incorporating the safety brake light system according to this invention.

FIG. 2 is a schematic electrical diagram for controlling the safety brake light system hereof FIG. 3 is a rear view of a conventional automobile which has been modified by the system of this invention.

Detailed Description of Preferred Embodiment

This invention is directed to an improved safety brake light system for vehicles, more particularly to a modified tail light bulb that can be effective in alerting trailing vehicles of the initiation of the braking system of a leading vehicle. Though other uses are contemplated for the light emitting device of this invention, the further description will be directed to a brake light system. Insofar as the preferred use, there is no need to modify or retrofit the existing brake light circuitry of a vehicle, The present invention will now be described with regard to the accompanying Figures, where like reference numerals represent like components or features throughout the several views.

Turning first to FIGS. 1 and 2, there is illustrated in FIG. 1 a preferred embodiment in the form of a modified brake light bulb 10 that features a conventional vacuum bulb 12, filament 14, and mounting base 16. As known in the art, conventional light bulbs, as found in various road vehicles, possess such components and are available under the designated numbers, such as but not limited to 1157, 1156, 3156 and 3157. In any case, for the present invention, the modified light bulb 10 includes an interrupter or intermediate circuit changing chip 20. The chip 20 includes the schematic circuit as shown in FIG. 2. Typically, when a brake pedal is depressed, the brake light is activated to reveal a constant light to alert approaching or ring vehicles of the activation of the braking system. Unfortunately, the constant light does not fully inform or alert the other drivers of the true action of the driving vehicle. With the present invention, the initial depression of the brake pedal will cause the brake light to rapidly flash, much like a strobe light, for a brief period, such as two to three seconds, then return to a normal operating mode of a constant light until pressure is removed from the brake pedal.

Turning specifically to the schematic diagram of FIG. 2, a key element of the circuit is the double timer mechanism 22, a component well known and commercially available as a 555 Timer by the National Semiconductor company, for example, that includes a reset, to control the rate of flash. The timer mechanism may be set to operate in a first mode for about 2 to 3 seconds to flash the tail light to approaching vehicles, then resorts to a second or normal operating mode of a constant light. The circuit further includes a hot wire 24 to electrically operate the circuit. Additionally, the circuit includes a switching device Q1, or Mosfet, which is similar to a transistor and capacitively coupled, to change the rate of flash of the light bulb 10. Further, the circuit includes a plurality of resistors R1 through R4, capacitors C1 through C3, and a diode D1, where the latter is a filter regulator to dissipate voltage within the system when in the normal or non-operating mode. Should there be a malfunction in the circuit, the circuit will allow the brake light to operate in the normal or constant light mode.

FIG. 3 illustrates the rear of a typical road vehicle that has been equipped with the modified light bulb of this invention. The light bulb 10, typically covered by a glass or plastic lens, will initially flash when the brake pedal is depressed to thereby alert the following driver of the activation of the braking system.

It is recognized that changes, variations and modifications may be made to the safety light emitting system of this invention without departing from the spirit and scope thereof. Accordingly, no limitation should be imposed on this invention except as set forth in the appended claims.

What is claimed is:

1. A safety light bulb mechanism for a vehicle operable in first and second specific modes, said modes being determined by a self-contained circuitry system, where said vehicle includes a portable electrical source, said bulb mechanism comprising:

a bulb and a base assembly for receipt in a complementary receptacle in said vehicle normally used to receive a conventional bulb mechanism, and an electric circuit adapted to said bulb and base assembly and in electrical communication with an actuator and said electrical source, said electric circuit containing a timer mechanism, with a time reset, upon actuation of said actuator to control the first said operating mode for a preselected time, then changing to the second said operating mode, where said first operating mode is a flashing/pulsing light and said second operating mode is a constant light;

wherein said electric circuit includes a filter regulator for the dissipation of voltage from said electric circuit during said second operating mode and for allowing said bulb to operate in said second operating mode in case of malfunction in said electric circuit.

2. The safety light bulb mechanism according to claim 1, including a switch to change the rate of flashing of said first operating mode.

3. The safety light bulb mechanism according to claim 2, wherein said preselected time is in the range of about 2 to 3 seconds.

4. The safety light bulb mechanism according to claim 1, wherein said electric circuit is contained within a chip disposed between said bulb and said base.

5. In combination with a vehicle having a braking system, operable by depression of a brake pedal, where said system includes a vacuum bulb mechanism, a receptacle for receiving said mechanism, and is operable by depression of said pedal to light said vacuum bulb mechanism, and a portable electric power source for operating said system, a safety light bulb mechanism for replacing said vacuum bulb mechanism in said receptacle and operable in first and second specific modes, said modes being determined by a self-contained circuitry system, said safety light bulb mechanism comprising:

a vacuum bulb containing an electrical filament and a base for receipt in said receptacle, and an electric circuit, in electrical communication with said electrical source, containing a timer mechanism, with a time reset, to control the first said operating mode for a preselected time, then changing to the second said operating mode, where said first operating mode is a flashing light and said second operating mode is a constant light;

wherein said electric circuit includes a filter regulator for the dissipation of voltage from said electric circuit during said second operating mode, and for allowing said bulb to operate in said second operating mode in case of malfunction in said electric circuit.

6. The combination according to claim 5, including a switch in said electric circuit to change the rate of flashing/pulsing of said first operating mode.

7. The combination according to claim 6, wherein said preselected time is in the range of about 2 to 3 seconds.

8. The combination according to claim 5, wherein said electric circuit is contained within a chip disposed between said vacuum bulb and said base.

* * * * *